Nov. 1, 1932.   H. KOESTER   1,885,209
PAPER STRETCH TESTER
Filed July 1, 1930   2 Sheets-Sheet 1

INVENTOR
*Herman Koester*
BY
*Fred F. Schuetz*
ATTORNEY

Nov. 1, 1932.  H. KOESTER  1,885,209
PAPER STRETCH TESTER
Filed July 1, 1930  2 Sheets-Sheet 2
FIG. 2
FIG. 3
FIG. 4
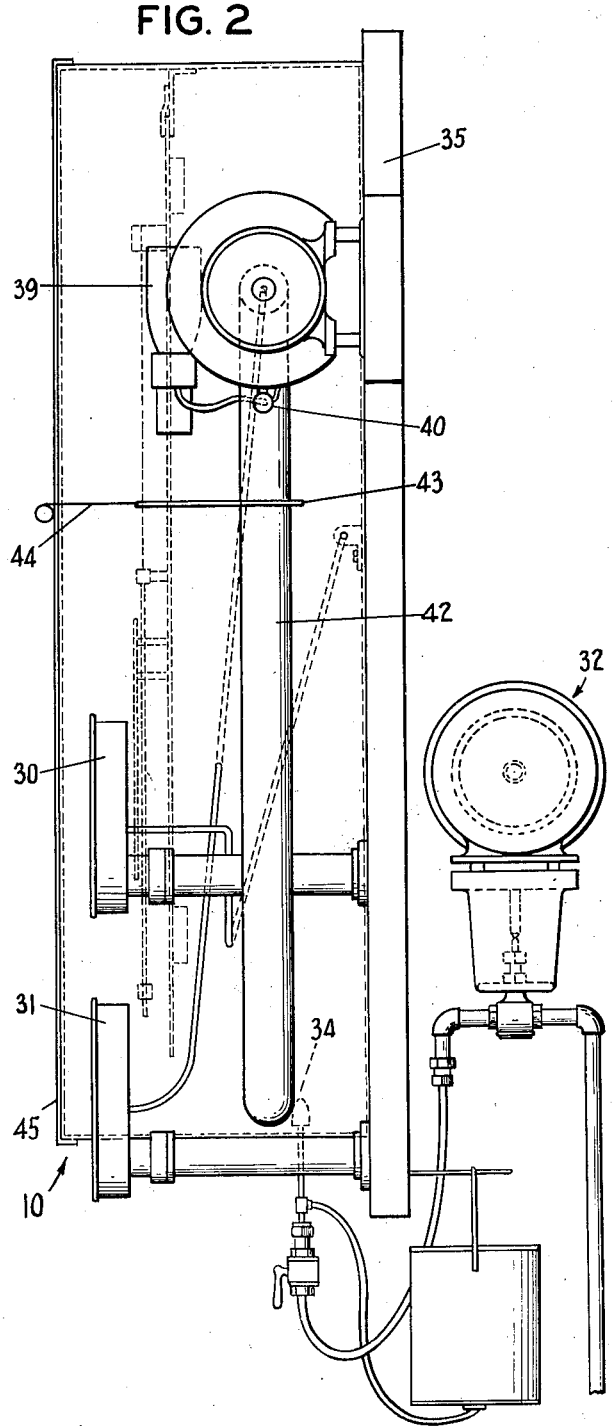
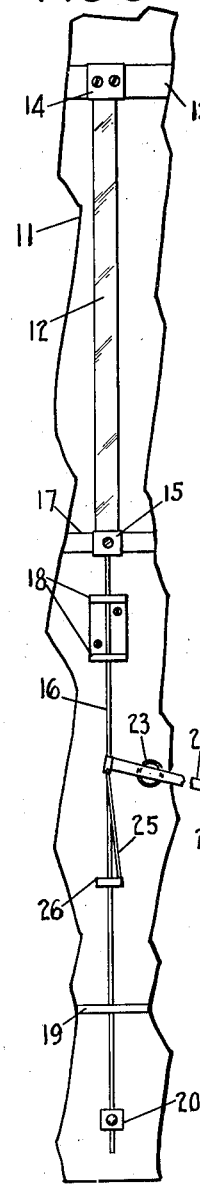
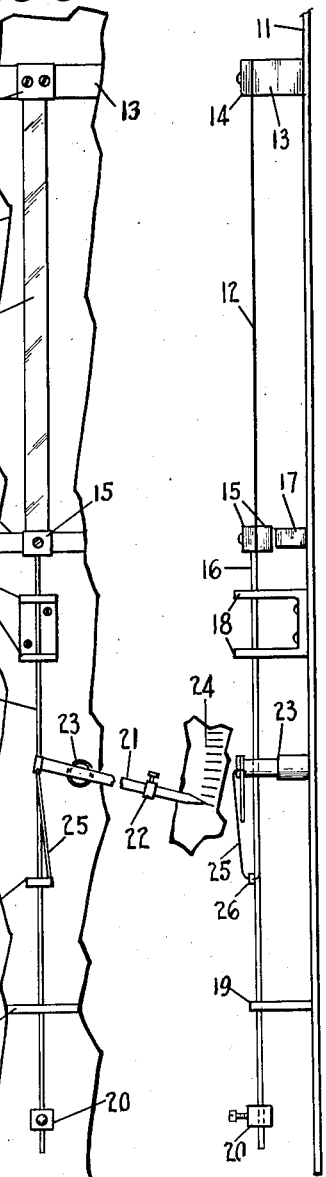
INVENTOR
Herman Koester
BY
ATTORNEY Patented Nov. 1, 1932

1,885,209

UNITED STATES PATENT OFFICE

HERMAN KOESTER, OF WATERBURY, CONNECTICUT, ASSIGNOR TO THE BRISTOL COMPANY, OF WATERBURY, CONNECTICUT, A CORPORATION OF CONNECTICUT

PAPER STRETCH TESTER

Application filed July 1, 1930. Serial No. 465,086.

The invention relates to measuring apparatus, and more particularly to apparatus for the determination of stretch in paper under different atmospheric conditions, more especially with respect to relative humidity. The invention has for its object the provision of a simple and conveniently operated tester device of this nature whereby comparative tests as to the extent of stretch may be made simultaneously upon a plurality of samples; and it has for a further object to provide such testing apparatus with means for maintaining predetermined conditions of relative humidity and temperature, as well as for varying the same.

In carrying out the invention, a plurality of paper strips of uniform length and width are designed to be rigidly secured at one end, while at the other and free end they are arranged to be placed under a like tension and to connect with suitable indicating members whereby any change in length due to stretching of the paper material will be registered so that a comparison may be had among the various samples under test. A plurality of test strips to this end is conveniently arranged within a closed chamber through which suitably conditioned air is arranged to be circulated; and this air may be varied both as to temperature and relative humidity, but is automatically maintained during a test period. Therefore, in setting up different atmospheric conditions within the chamber and obtaining readings of the stretch under the various conditions established, curves may be plotted therefrom to show clearly the behavior of the different samples.

The nature of the invention, however, will best be understood when described in connection with the accompanying drawings, in which:

Fig. 2 is a side elevation thereof.

Figs. 3 and 4 are respectively a fragmentary front elevation and a fragmentary side elevation on an enlarged scale of the indicating mechanism and paper sample support, together with actuating connections between a sample and its indicating device.

Figure 1:
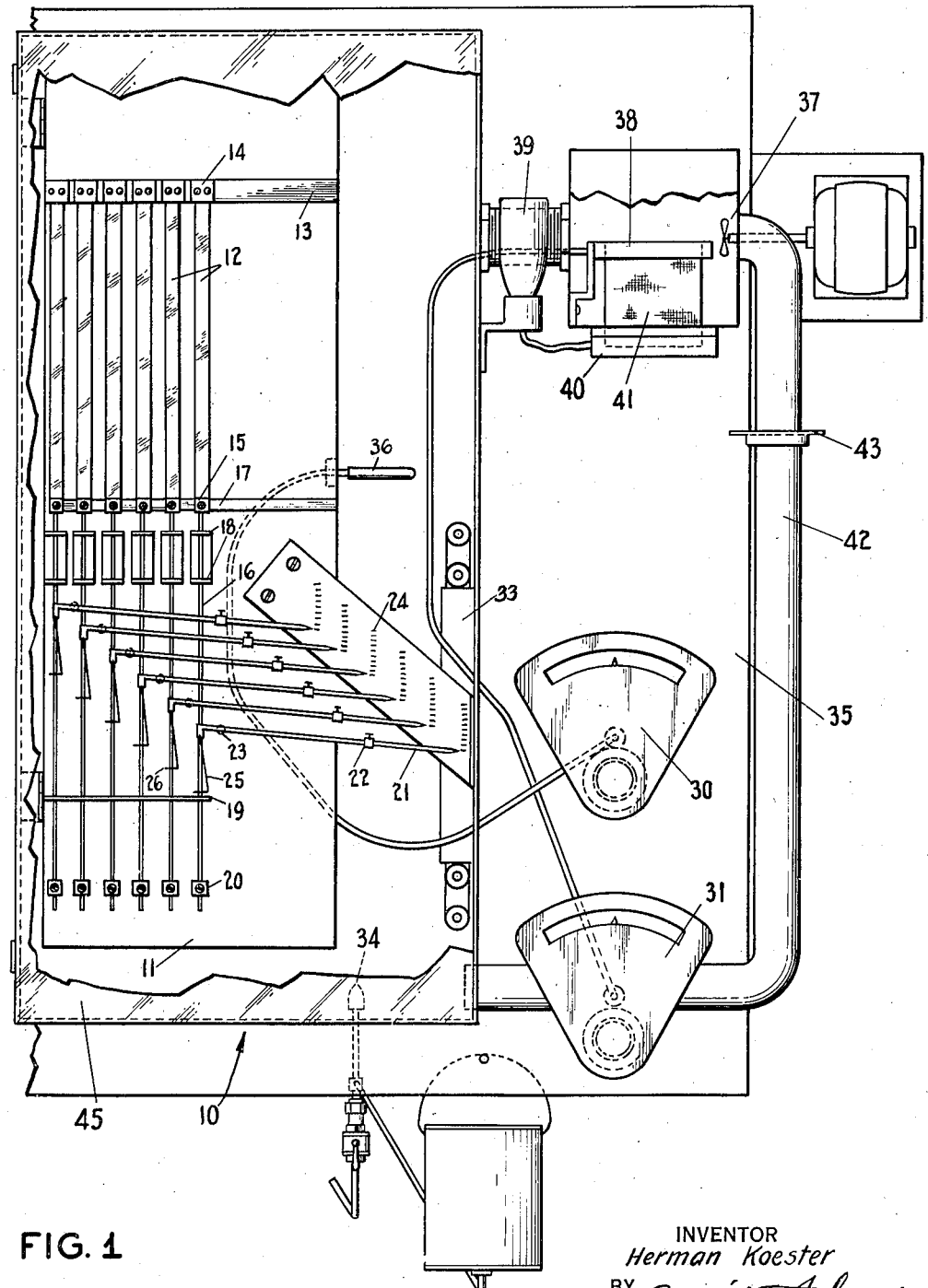
Fig. 1 is a front elevation of the stretch tester apparatus with portions broken away.

Referring to the drawings, 10 designates a suitable casing or cabinet in the interior of which is a panel 11 designed to have mounted thereon a plurality of test strips 12, the panel, for example, being hinged to swing outwardly to afford convenient access in securing the strips thereon for test. These strips consist of the different paper samples to be tested which are cut for this purpose to equal lengths and are of the same width throughout.

At the upper end of a sample, the same is arranged to be clamped to a bar or stationary support 13 as by means of clamping blocks 14 to attach a strip firmly to the panel. At its lower end, a strip is secured between two block members 15 to which is secured, also, a downwardly extending rod or wire 16; and a guide bar 17 is positioned immediately behind the various blocks 15 to prevent inward swing and twist of a strip and rod. The latter is, further, suitably guided as in passing through guide members 18 and 19 which extend outwardly from the panel.

Moreover, at its lower end a rod carries a tensioning weight 20 of sufficient mass to hold the paper samples reasonably taut and to exert the desired degree of tension thereon, as well as to counterbalance a pointer of multiplying mechanism to be operated through the extension of the paper sample under the applied tension.

This multiplying mechanism comprises a pointer element which may be an indicating or recording arm 21 with adjustable counterweight 22, which is required for the first adjustment in order to counterbalance the associated parts so that the only tension influence exerted on a paper strip 12 would be that due to the tensioning weight 20 and of exactly the same value for all of the strips. Each recording arm, furthermore, is fulcrumed to the panel as at 23, while its outer end is adapted to move over a graduated scale on a scale plate 24 also carried on the panel. At its inner end, the lever is linked by a wire 25 with the pointer or rod 16 as in being connected to an arm 26 attached to the latter.

It will be understood that each of the rods 16 is thus provided with an indicating pointer, the attachment of the actuating connections therefor being progressively lower along the different rods and the different graduated scales being correspondingly arranged upon the scale plate 24. Thus, as the individual paper strips 12 stretch differently under the equal tensions applied thereto, the extent of each stretch will be indicated upon a corresponding scale and readings may be had of the comparative stretches under the same atmospheric conditions.

The latter may conveniently be provided and maintained within the casing 10 by a suitable temperature regulator device 30 and a humidity regulator device 31 with motor-operated air valve control device 32. The former operates to control the heat developed by an electrical heating element, as a resistor member 33 mounted within the casing, and the latter devices to control the degree of moisture discharged as spray from a nozzle 34 into the said chamber, all of which is well understood and forms no particular part of the present invention. The regulator instruments 30 and 31 aforesaid are of any well-known or special design and may conveniently be mounted upon a board or wall 35 exteriorly of the casing 10 and to which the latter may also be secured, as indicated.

A dry-bulb thermometer 36 is mounted within the cabinet for determining the operation of the combined temperature-control and temperature-indicating device 30; and a fan 37 and driving motor therefor is arranged to draw air from the interior of the said casing 10 over a wet-bulb thermometer 38, preferably located exteriorly of the casing, for determining the operation of the combined humidity-control and humidity-indicating device 31. An inverted water jar 39 is arranged in the usual manner to supply water to wick pan or trough 40 associated with the bulb of thermometer 38 for maintaining moist a wick 41 about the same. The said fan 37 is designed, moreover, to cause a suitable circulation of the atmosphere through the casing 10 as by means of a duct or flue 42 connected with the top and bottom of the casing, as indicated. A damper 43 with actuating handle 44 may be provided in the circulating duct 42 for controlling the flow therethrough.

The atmospheric conditions within the casing 10 may, therefore, be maintained substantially constant during a period of test, it being understood that the casing is to be closed at the front during such test, for example by a transparent cover or door 45, so that the indications afforded by the different pointers 21 may be visible. In order to effect a change in atmospheric conditions within the casing 10, it is necessary merely to correspondingly set the temperature-control device 30 or the humidity-control device 31, or both. These will then automatically provide the desired conditions in the usual and well-known manner. It will be understood, also, that those portions of the apparatus such as the strip supports, mountings for the recording arms, the scale plate, etc., which would affect the accuracy of the readings because of a change in length at different temperatures are to be constructed of zero temperature-expansion coefficient material.

I claim:

1. A paper-stretch tester, comprising a fixed support, means to suspend therefrom one end of a plurality of test strips, tensioning members attachable to the opposite ends of the individual strips, and respective measuring means connected with the respective tensioning members and actuated by movement thereof.

2. A paper-stretch tester, comprising a closed test chamber and means to maintain predetermined atmospheric conditions therein, means to suspend from one end a plurality of test strips in said chamber, tensioning members attachable to the opposite ends of the individual strip, and a plurality of measuring means secured to the respective tensioning members at progressively lower points and actuated thereby.

3. A paper-stretch tester, comprising a closed test chamber, a panel swingably mounted therein, means to suspend from said panel at one end a plurality of test strips, tensioning members attachable to the opposite ends of the individual strips, bearing means on said panel for guiding the tensioning members for vertical movement resulting from the stretch of a strip, a scale-bearing member movable with the panel, and respective measuring means pivotally mounted on said panel, actuated by the movement of a tensioning member and cooperating with the scale-bearing member.

4. A paper-stretch tester, comprising a closed test chamber, a panel swingably mounted therein, clamp members carried by the panel for suspending at one end a plurality of test strips, tensioning members and respective clamps associated therewith for securing a tensioning member to the opposite end of a strip, bearing means on said panel for guiding the tensioning members for vertical movement resulting from the stretch of a strip, a scale-bearing member movable with the panel, and respective measuring mean pivotally mounted on said panel, actuated by the movement of a tensioning member and cooperating with the corresponding scale-bearing member.

5. A paper-stretch tester, comprising a support, means to suspend therefrom one end of a plurality of test strips, tensioning members attachable to the opposite ends of the individual strips, respective measuring means actuated by the movement of a tensioning member, and means to counterbalance the said measuring means.

In testimony whereof I affix my signature.

HERMAN KOESTER.